H. M. POPE AND F. A. JOHNSON.
RIFLING MACHINE.
APPLICATION FILED APR. 14, 1916. RENEWED JUNE 14, 1920.
1,368,051.
Patented Feb. 8, 1921.
11 SHEETS—SHEET 3.
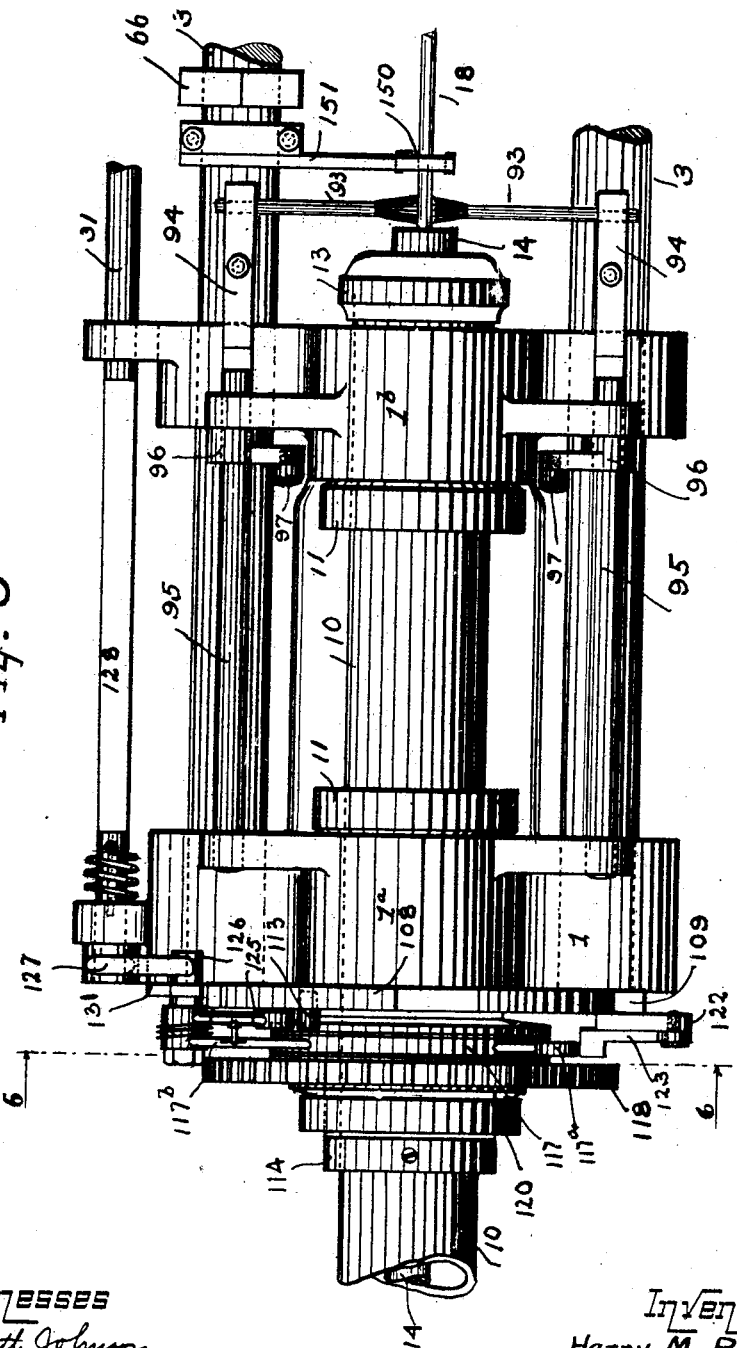

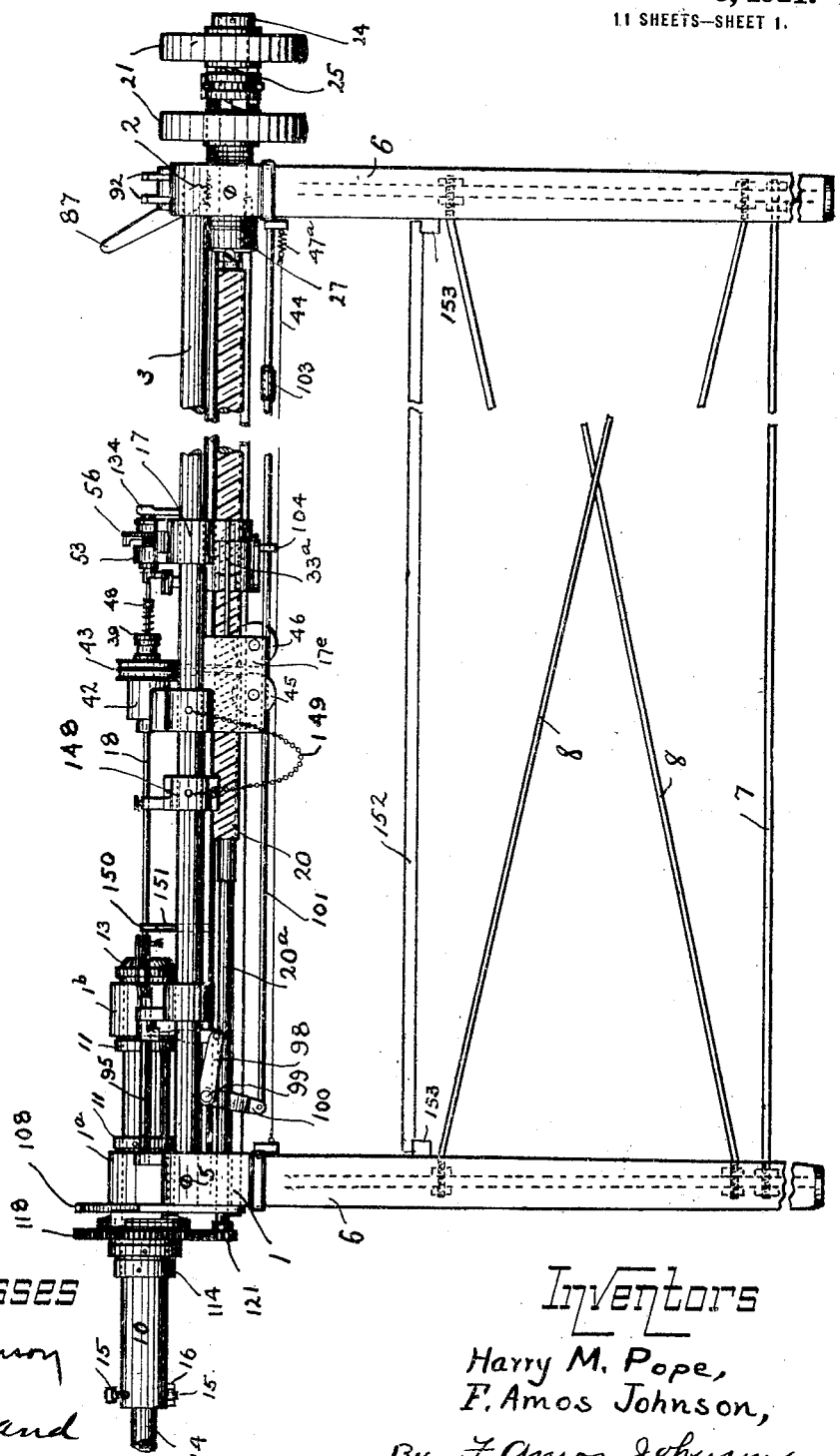

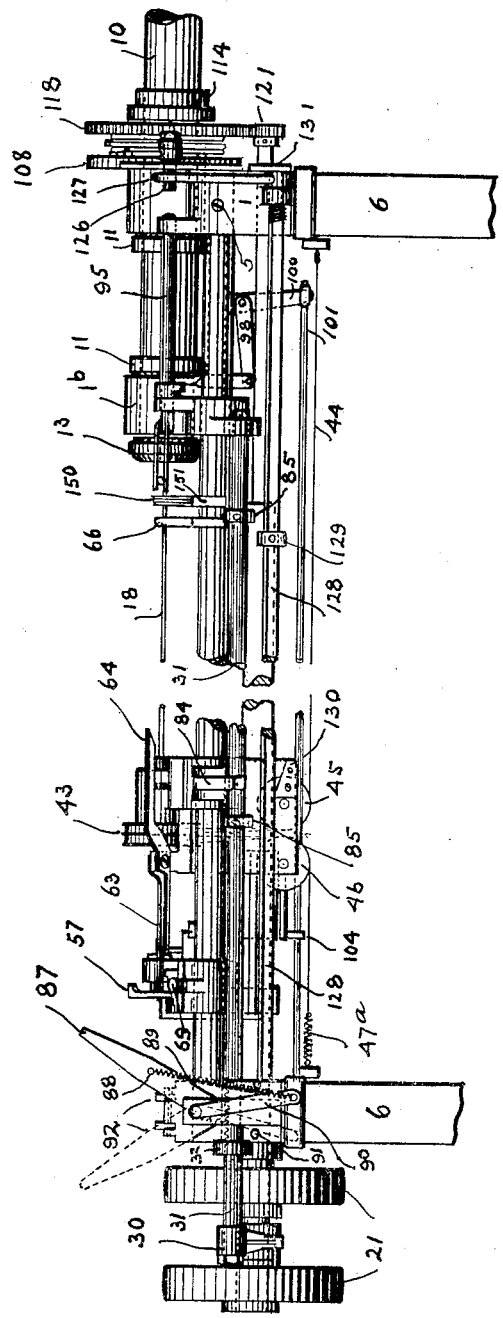

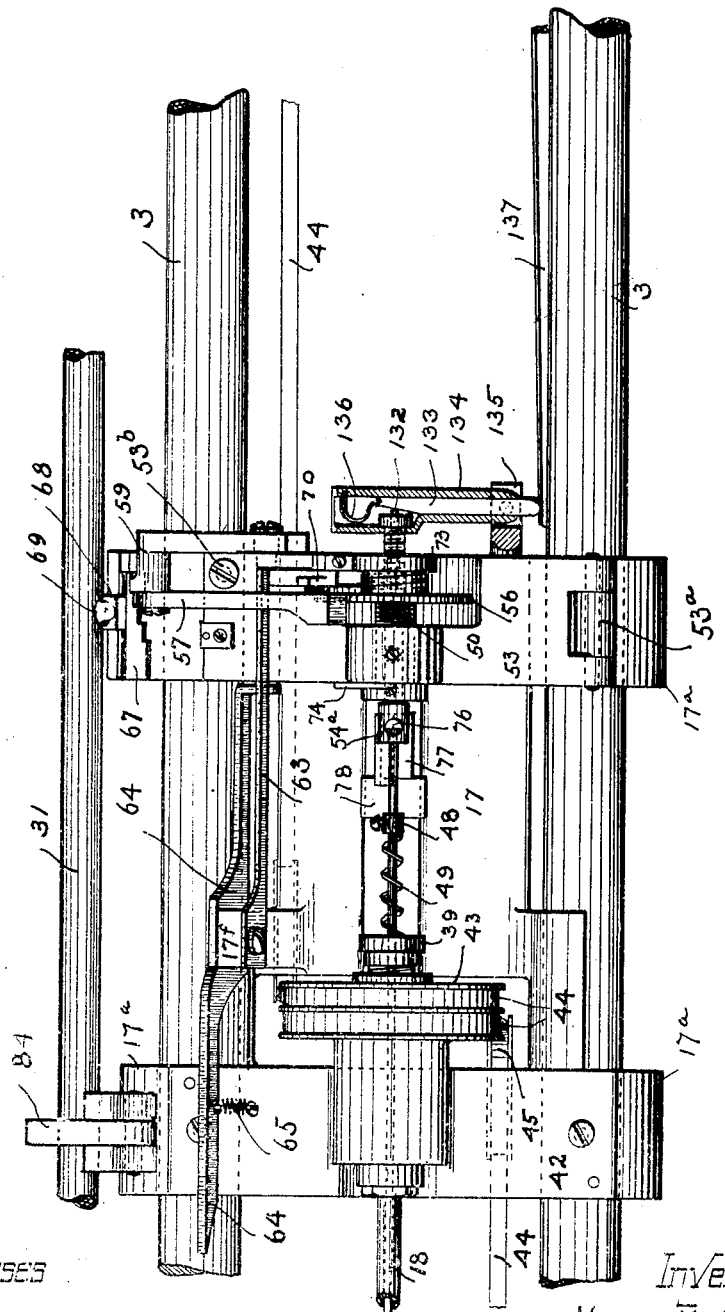

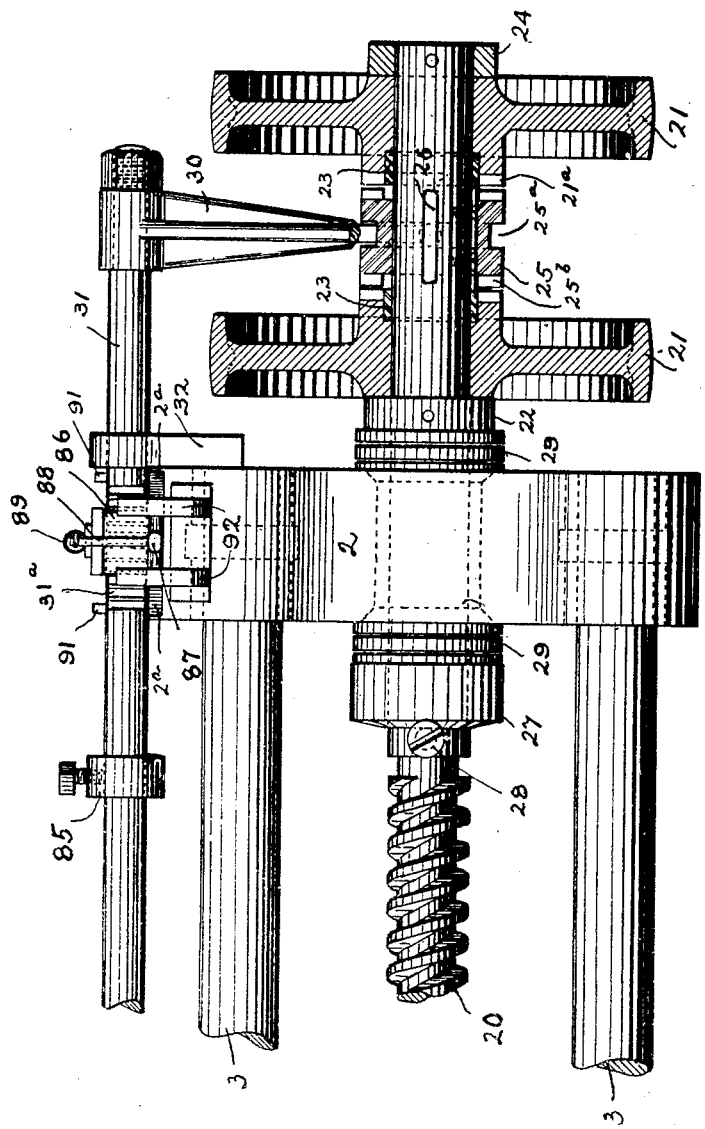

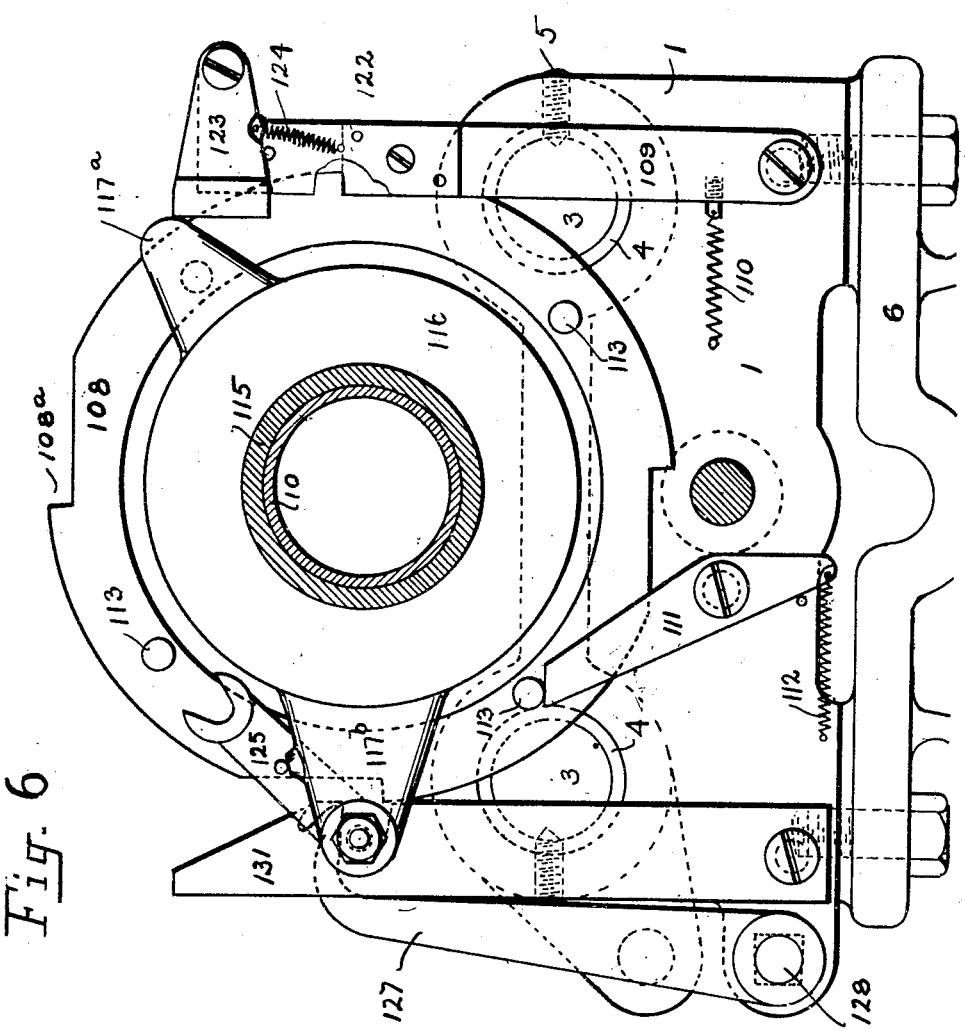

H. M. POPE AND F. A. JOHNSON.
RIFLING MACHINE.
APPLICATION FILED APR. 14, 1916. RENEWED JUNE 14, 1920.
1,368,051.
Patented Feb. 8, 1921.
11 SHEETS—SHEET 7.
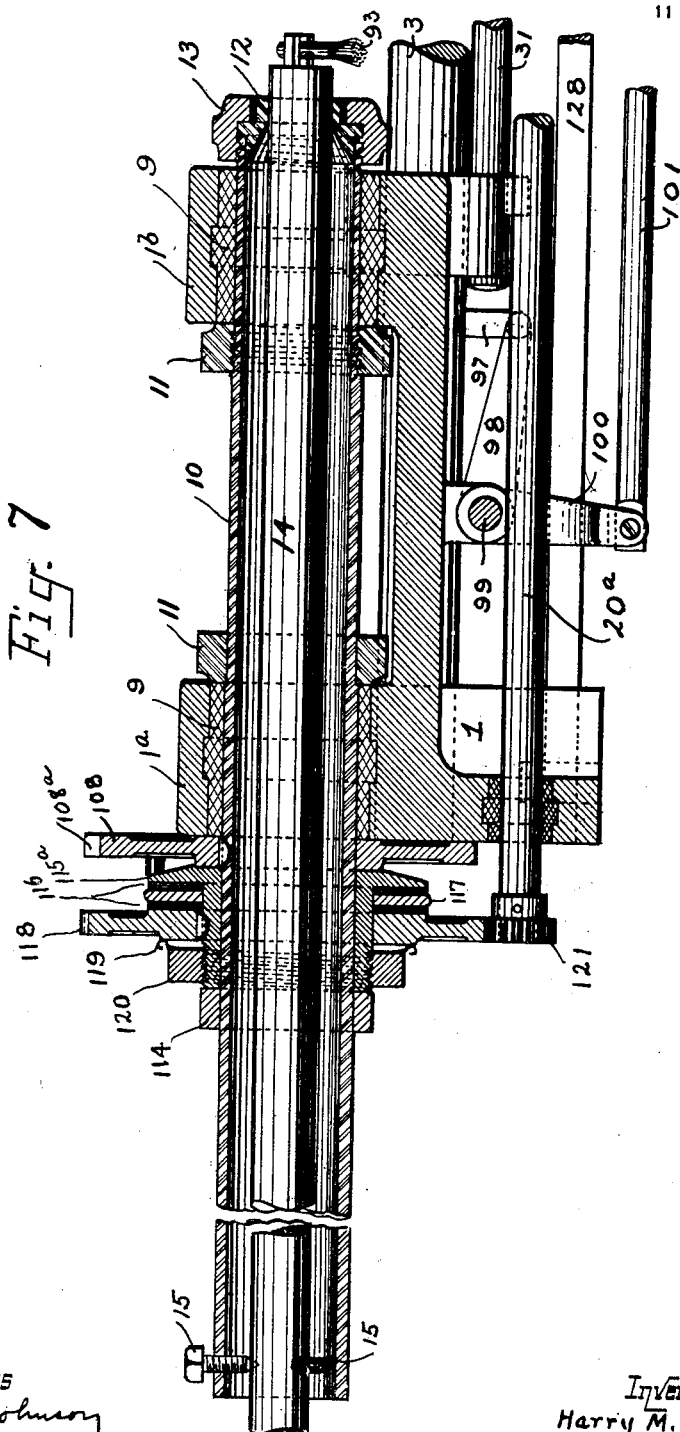
Witnesses
Seth Johnson
J. S. Brand
Inventors
Harry M. Pope,
F. Amos Johnson,
By F. Amos Johnson Att'y.

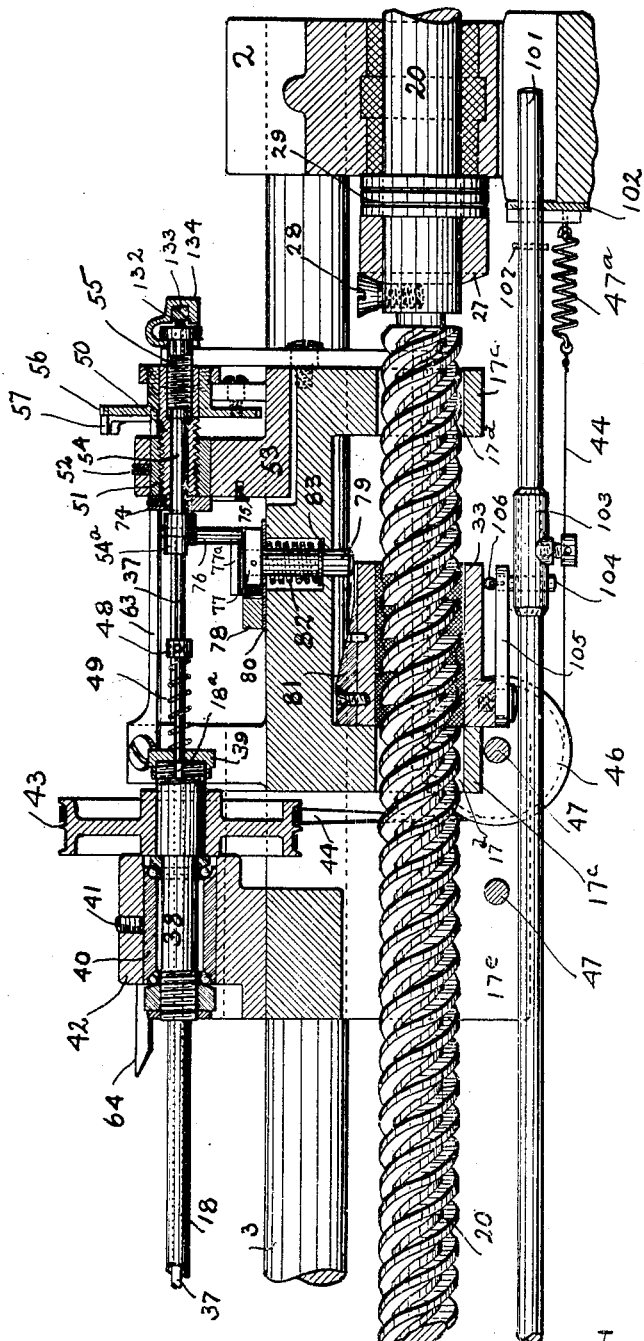

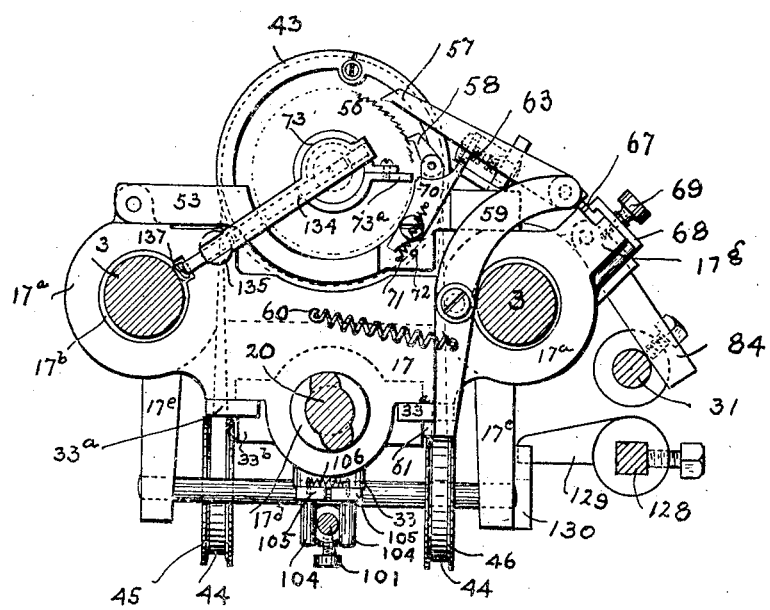

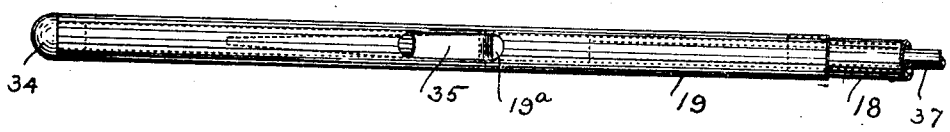
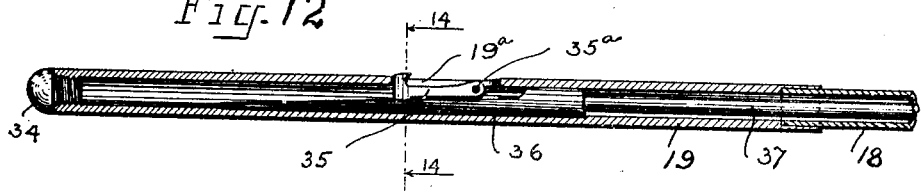
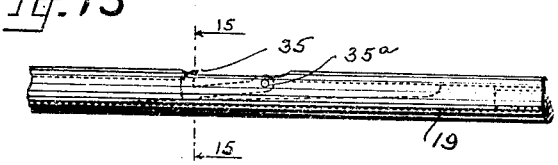
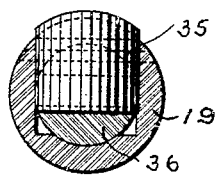
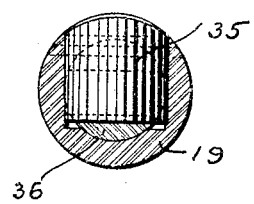

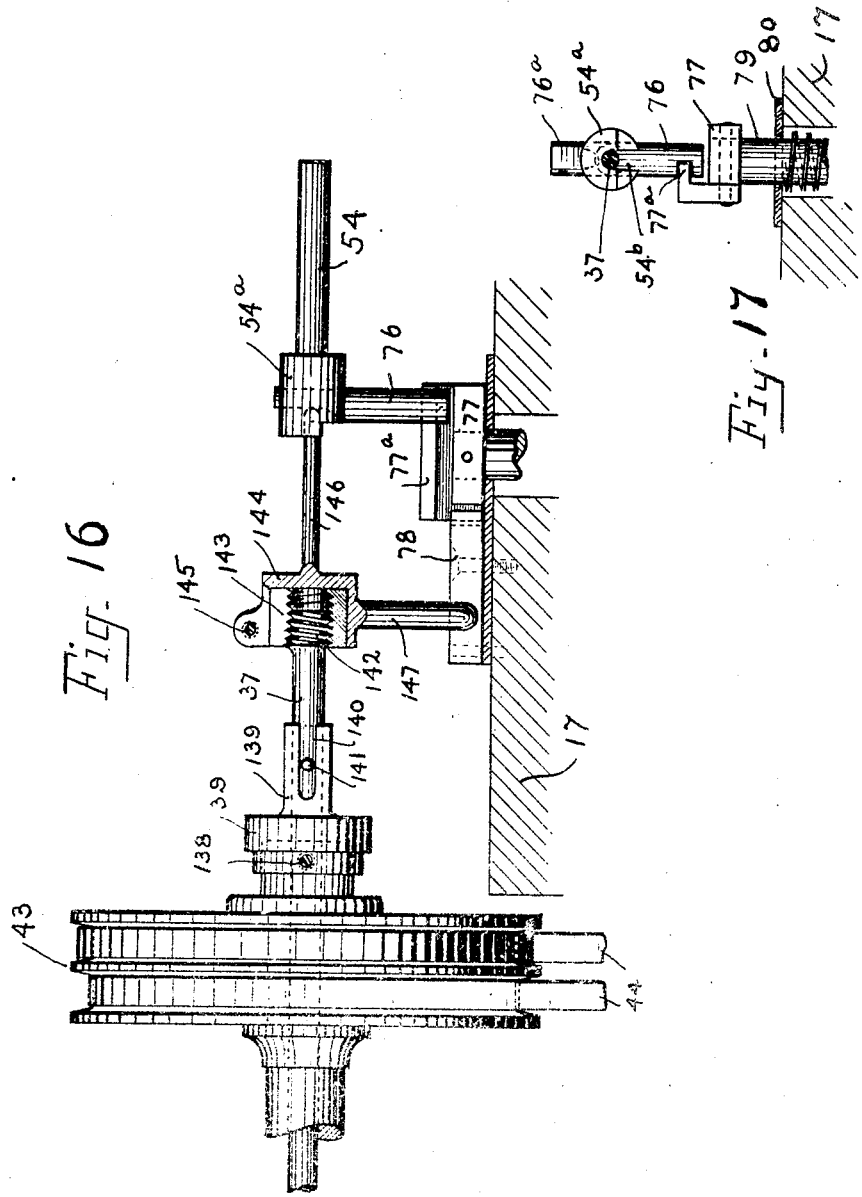

UNITED STATES PATENT OFFICE.

HARRY M. POPE, OF NEW YORK, N. Y., AND FRANK AMOS JOHNSON, OF DUNELLEN, NEW JERSEY, ASSIGNORS, BY MESNE ASSIGNMENTS, TO HARRY M. POPE, OF NEW YORK, N. Y., FRANK A. JOHNSON, OF NEW HAVEN, CONNECTICUT, AND JESSIE W. ATKINS, OF DOBBS FERRY, NEW YORK, EXECUTRIX OF GEORGE J. ATKINS, DECEASED.

RIFLING-MACHINE.

1,368,051.  Specification of Letters Patent.  Patented Feb. 8, 1921.

Application filed April 14, 1916, Serial No. 91,047. Renewed June 14, 1920. Serial No. 389,003.

*To all whom it may concern:*

Be it known that we, HARRY M. POPE and FRANK AMOS JOHNSON, both citizens of the United States, the former a resident of New York city, county and State of New York, and the latter a resident of Dunellen, county of Middlesex, and State of New Jersey, have invented certain new and useful Improvements in Rifling-Machines, of which the following is a specification.

Our invention comprises a complete rifling machine or machine for cutting the spiral grooves in rifle barrels. It is designed with a special view of producing a machine which is light in weight, which can be quickly and cheaply made, which occupies a small amount of floor space, which can be packed into small compass in boxing for shipment—a machine which is efficient and rapid in its operations, easy to operate, not likely to get out of order and one in which the wear on the rifling cutters is reduced to a minimum. In the following description, reference is made to the accompanying drawings, in which:

Figure 1 is a front elevation, with parts broken away;

Fig. 2 is a rear elevation of the working portion of the machine, with part of the framework broken away;

Fig. 3 is a plan of the head or left portion of the machine;

Fig. 4 is a plan of the carriage;

Fig. 5 is a plan of the right hand portion of the machine, showing the tail block and driving mechanism—the three views, placed tandem, in the order named, give substantially a plan of the entire machine;

Fig. 6 is a left sectional elevation on the line 6—6 of Fig. 3;

Fig. 7 is a vertical, longitudinal section through the spindle;

Fig. 8 is a vertical, longitudinal section through the carriage;

Fig. 9 is a right elevation of the carriage;

Fig. 10 is a plan view showing the carriage nut and the cutter feeding lever which it operates;

Fig. 11 is a view of the rifling head from the cutter side;

Fig. 12 is a longitudinal section of the same;

Fig. 13 is a partial side view of the rifling head;

Fig. 14 is a cross section on the line 14—14 of Fig. 12;

Fig. 15 is a cross section on the line 15—15 of Fig. 13;

Fig. 16 shows, in side elevation, an alternative construction of a device for increasing the depth of the rifling and Fig. 17 is a detached detail showing, in end elevation, part of the cutter relieving device.

The base or framework on which the working parts of the machine are mounted is in the form of an open, rectangular frame, composed of a head 1 and a tail block 2, with connecting side rails 3, which are secured in pockets of Babbitt metal 4 and held also by set screws 5—there being two places of attachment for each side rail in the head, which stiffens the frame and prevents its being twisted out of shape. This frame is mounted on two legs 6 having lower tie rod 7 and a pair of cross tie rods 8—the legs being exactly the same and the frame similar to the frame of our drilling and reaming machine, application for Letters Patent for which are filed simultaneously herewith.

The head has two upwardly projecting portions 1$^a$ and 1$^b$ for the babbitted bearings 9 of the hollow spindle 10. End chase of the spindle is prevented by two collars 11.

A bushing 12 is clamped in and against the right hand end of the spindle by a chambered cap nut 13 which is screwed on the end of the spindle. The bushing 12 is chamfered or countersunk on its inside so as to pick up the end of the barrel 14 which is to be rifled, when the barrel is pushed through the spindle from the outside end and the hole through the bushing just fits the barrel. The barrel is clamped in the outer end of the spindle by three radial set screws 15 which are inserted through the walls of the spindle—one of these screws having a pointed end so as to firmly clamp the barrel and the other two set screws having blunt ends are provided with check nuts 16, which may be set for a standard barrel and the barrels put in and taken out without changing the adjustments of these two screws. The pointed screw will mark the barrel when first clamped in and this affords a means so that the barrel may be removed during the process or operation of rifling and reinserted in exactly the same position and the work continued.

A reciprocating carriage 17 is mounted on the side rails and carries the rifling rod 18 with the rifling head 19 on its left end. As the carriage is moved back and forth causing the rifling head to traverse the barrel, the rod is given a rotating movement so as to make a spiral cut in the barrel and between strokes the barrel is indexed around so as to cut a plurality of rifling grooves, all of which will be more fully explained.

The carriage is mounted to slide on the side rails similar to the manner in which the carriage of the drilling machine referred to is mounted. Four ears 17$^a$ are provided with roughly cored holes or pockets which are somewhat larger than the side rails. The rails are inserted and the pockets filled with Babbitt metal 17$^b$. It is preferable to babbitt the carriage onto a pair of arbors, properly spaced, which are slightly larger than the side rails and to slip the carriage onto the rails before securing them to the head and tail block, so as to give the carriage a free sliding fit on the side rails.

The reciprocating movement of the carriage is effected by a traverse screw 20 which is mounted to turn in bearings in the head and tail block—the left end portion of the screw being in the form of a plain rod 20$^a$, of smaller diameter than the screw. The right hand end of the screw is also plain and extends beyond the tail block and has two drive pulleys 21 mounted on it, which are loose on the screw shaft and held between collar 22, two collars 23 and outside collar 24. Between the pulleys there is a sliding clutch of ordinary construction, 25, which is adapted to slide on a spline or feather 26 and provided with an annular groove 25$^a$. This clutch has teeth 25$^b$ which may be engaged by similar teeth 21$^a$ on the hubs of the pulleys 21; or the clutch may occupy a neutral position between the pulleys without being engaged by either of them. The pulleys are driven in opposite directions and the clutch is thrown into engagement first with one and then with the other, so that the traverse screw is rotated alternately in opposite directions. Inside the tail block the screw shaft has an adjustable collar 27 which is held by a conical headed screw 28, the action of which is obvious and on each side of the tail block there is a ball thrust bearing 29. The movements of the clutch are controlled by a shipper fork 30 which is controlled by a shipper rod 31—the rod being mounted to slide in the head at one end and in a bracket 32 secured to the tail block, at the other end. The manner in which the shipper rod is operated will be explained later.

The carriage 17 already pointed out (see Figs. 4, 8, 9 and 10) has two lugs 17$^c$ projecting from its under side through openings 17$^d$ in which the traverse screw passes. Between the lugs 17$^c$ the screw is engaged by a traveling nut 33 which is mounted on the carriage and kept from turning by two bars 33$^a$ secured to the under side of the carriage—the nut being provided with ears 33$^b$ for engagement with the bars. The nut is shorter than the opening between the lugs, so that it has a sliding movement on the bars which hold it on the carriage. From the construction it is evident that the carriage can be propelled or reciprocated back and forth by rotating the traverse screw first in one direction and then the other and that, on reversing the direction of the rotation of the screw, there will be a period of rest while the nut is moved from one of the lugs 17$^c$ to the other. This period of rest is used at one end of the stroke to index the barrel and feed out the rifling cutter and at the other end of the stroke to wipe the chips from the cutter, all of which operations will be described in due course.

The rifling rod 18, already pointed out, is tubular in form and has on its left end the rifling head 19, which carries, in a pocket 19$^a$, a rifling cutter 35. This cutter is of the "hook" variety and it is pivotally held in the pocket by a pin 35$^a$. The free end of the cutter, which has the cutting edge, is driven outward by a wedge 36, which is secured on the end of the feed rod 37. This rod extends through the rifling rod and projects beyond it at its right hand end. By thus pivotally attaching the cutter, the pull of the cutting edge, which is on the free end and above the pin, holds that end down firmly against the wedge and there is little or no tendency for the cutter to dig in. A cap plug 34 is to keep dirt and chips out. By using a tubular rifling rod and feeding the cutter out from the carriage end, a shorter machine is possible.

On the carriage, the rifling rod is axially attached to a rotating sleeve 38, the two being locked together by a key 18$^a$ and a screw cap 39, which is perforated at its center for the feed rod 37. The rotating sleeve 38 is mounted in a ball bearing sleeve 40, of common construction, and is held in place by a set screw 41 in a bracket 42, secured to the carriage at its left hand edge. The sleeve has on its projecting end a double grooved pulley 43. A steel tape 44 is attached to the pulley in each groove, one of them passing downward around an idler 45 and extending to the left where it is secured to the left leg and the other tape, which is wound around the pulley in an opposite direction, passing downward around an idler 46 and extending to the right where it is attached to the right leg—a take-up spring 47ª being interposed. The idlers 45 and 46 are mounted on rods 47 which extend across from front to rear in downwardly projecting flanges 17ᵉ of the carriage. From the above construction it will be evident that, starting with the carriage at the left and the rifling head extending clear through the barrel, as the carriage is moved to the right the cutter will make a spiral groove in the barrel; that the rapidity of the twist will depend on the size of the rotating pulley 43 and the direction of the twist (right or left hand) will depend on the attachments of the tapes.

The feed rod 37 has, near its right hand end, a collar 48 and is held to the right by a spring 49 wound around the rod and tends to draw out the wedge 36 to which it is attached so that the thin end will be under the cutter 35 and the cutter will be drawn in as shown in Figs. 13 and 15. By forcing the feed rod to the left the wedge will drive the cutter out. This is done, gradually, step-by-step, during the operation of rifling, in the following manner:

A hollow feed screw 50, working in a nut 51, which is clamped by a set screw 52 in a bracket 53—the bracket being secured on top of the carriage near its right hand end—has a sliding plug 54 projecting from its left end and an adjusting screw 55 in its right hand end, by means of which the plug may be forced out of the feed screw and is in effect a means of lengthening or shortening the feed screw. The bracket 53 is hinged at its front end to an ear 53ª of the carriage and the rear end is held by a screw 53ᵇ. By removing the screw the bracket and parts mounted on it may be swung out of the way to insert or take out the rifling rod. The projecting feed screw plug has an enlarged end or head 54ª which, for the present, may be considered in contact with the feed rod—the interposed wedge being ignored. On the outer end of the feed screw there is a ratchet wheel 56 which is adapted to be engaged by a feed pawl 57 and which is held from backward movement by a retaining pawl 58 mounted on the bracket. The feed pawl is attached to the upper end of a lever 59 which is fulcrumed on the right hand side of the carriage and provided with a retracting spring 60. The lower end of this lever is in contact with the free end of a horizontal lever 61 which is pivoted on the under side of the rear plate 33ª (Figs. 9 and 10). This horizontal lever has a cam 61ª on its front edge which rests against a roll 62 mounted on the nut 33. As the carriage is moved from left to right between the lugs 17ª, the lever 61 is forced backward, thereby carrying the upper end of the lever 59 with the feed pawl forward and feeding the ratchet wheel 56 provided the feed pawl is permitted to be in engagement with the ratchet wheel. Normally the feed pawl is held out of engagement with the ratchet wheel by an arm or lever 63 which is pivoted to a lug 17ᶠ on the top of the carriage (Fig. 4)—the end of the arm being held upward by the hooked end of a lever 64 which is fulcrumed on the back side of the lug 17ᶠ, the left end of which is normally drawn down by a spring 65. A block 66 is secured to the rear side rail near the head 1 and when the carriage is in its left hand position with the cutter of the rifling head clear through and outside of the barrel, the inclined under side of the end of the lever 64 strikes the block 66, thereby raising it and, through the parts pointed out, permitting the feed pawl to engage the feed ratchet wheel—the first movement of the nut, acting through the parts pointed out, to move the feed pawl and turn the feed ratchet wheel, thereby moving the feed screw 50 to the left (it being a left handed screw) and driving the wedge under the cutter in the rifling head. The amount of feed each time is determined by the stepped gage block 67 which is held by a bar 68 and knurled clamp screw 69, which are mounted on a lug 17ᵍ of the carriage. This gage block as shown can be set to allow from one to six teeth for each feed.

Movement of the feed ratchet is automatically stopped when the rifling has reached a predetermined depth, in the following manner (Fig. 9): A latch pawl 70 is pivoted on the right hand side of the carriage bracket 53. Normally this latch is held by a spring 71 so that its bottom end will rest against a pin 72 in the bracket and the arm 63 is free to rise and fall. A clamp ring 73, having an extending knockout arm 73ª is threaded onto the hub of the ratchet wheel 56 and, for convenience in setting, the pitch of the thread is made the same as the pitch of the feed screw. This ring can be adjusted and clamped in such a position that the knockout arm will reach the latch 70 when the feed screw has made any desired number of turns or parts of a turn, and throw it over so as to come under the end of lever 63 and latch up or lock the feed pawl and prevent said pawl from engaging the ratchet wheel, thereby stopping further movement of the feed screw. The feed screw is returned to starting position by hand and has an arm 74 on its left end which comes in contact with a pin 75 in the bracket 53 when the screw is back to starting position. This pin projects less than the pitch of the feed screw so that it will pass it on the first revolution outward. This stop arm and pin insures the feed screw and its ratchet wheel being returned to exactly the same position every time.

There are two forms or types of rifling cutters in common use, the "hook" form and the "scrape" form. The latter variety, as is well known, is adapted to cut in both directions, going in and coming out of the barrel, although they are fed out only at one end and, theoretically, should cut only in one direction. It has been a common practice to operate the hooked form of cutter the same way, that is, to feed it out, draw it through the barrel and return it for another feed without withdrawing the cutter or relieving it in any way. There is spring enough to the parts so that the cutter will rub hard in going back and it soon becomes dull. We have provided a relief device which withdraws the cutter wedge slightly on every back stroke, thereby relieving the pressure on the cutter and by its use the cutter will stay sharp very much longer and a much cleaner groove can be cut. This is accomplished in the following manner: The head 54$^a$ of the plug 54 has a vertically sliding bolt 76, which is beveled at its top end forming a wedge 76$^a$. The plug has a hole drilled in its left end through which the feed rod 37 enters and rests against the wedge bolt. For convenience in getting apart a slot 54$^b$ is cut on the under side of the head 54$^a$. This saves withdrawing the feed rod 37 and prevents its being accidentally bent when the bracket 53 is raised. The lower end of the bolt 76 is notched to receive and slide on a horizontal flange 77$^a$ of a bar 77, one end of which is guided by a block 78 on the carriage. The flanged bar has a vertically sliding stem 79 which extends downward through a guide plate 80 and through the bottom of the carriage and rests on a wedge 81 which is fastened on the top side of the nut 33—a spring 82 acting against a flange 83 on the stem, tends to draw all the parts downward to the position shown in Fig. 8, in which position the feed rod 37 rests on the low or thin part of the wedge bolt 76 and the cutter feed wedge will be withdrawn, allowing the cutter in the rifling head to fall back into its pocket. This is the position the parts assume just before the carriage starts to move to the left. With the first movement of the traverse screw toward the right, simultaneous with the ratchet feed, the wedge 81 will force the wedge bolt 76 upward so that the feed rod will rest on the straight edge of the bolt and the whole will be moved bodily out by the feed screw. In using the scrape form of cutter the wedge bolt may be taken out and the hole plugged in any convenient manner.

The carriage has a stop arm 84 pivoted in its left ear, on the rear side, which rides along on the shipper rod 31 until it reaches one of the two adjustable stop collars 85 on the rod. The rod is then moved, throwing the clutch which throws the screw into engagement with the other pulley, thereby reversing the movement of the carriage. In order that the shipper movement may be complete and the clutch thrown completely out of engagement with one pulley and into engagement with the other, we have cut rack teeth 31$^a$ on the upper side of the shipper rod near its right end bearing and mount on the rear side of the tail block a sector gear 86 having an upwardly extending shipper lever 87. This lever has a pin 88 to which is attached the upper end of a spring 89. The lower end of the spring is attached to a swinging arm 90 which is pivoted a short distance above the center of the sector gear 86. The movements of the arm 90 are limited by side pins 91 and the lever 87 is limited in its movements by the side walls of a pocket 2$^a$ cut in the tail block. As the reversing arm on the carriage moves the shipper rod the arm 87 is thrown over with considerable force—sufficient to carry the swinging arm 90 beyond the dead center, when it will swing on to the limit pin on that side and the action of the spring will then draw the shipper lever clear over and carry the clutch into reverse engagement.

In order to stop the carriage positively and exactly at either end of the rifling stroke, to examine the cutter or for any other purpose, we have provided two latch arms 92 on the rear end of the tail block. By throwing either of these latches backward into the path of the shipper lever, that lever will not be carried clear over, but will be stopped in vertical position, with the driven clutch in its central or neutral position. The action of the machine may be stopped at any point by bringing the shipper lever to vertical position and it may be made safe in that position by throwing both latches 92 back so as to lock the shipper lever.

As the rifling rod is drawn out of the right hand end of the barrel the chips are wiped from the cutter by brushes 93 which are held by clamps 94 on the ends of front and rear rock shafts 95. These rock shafts have arms 96 which are joined by connecting links 97 to arms 98 on the front and rear ends of a transverse rock shaft 99 which is mounted on the underside of the head 1. This transverse rock shaft has a central arm 100, to the lower end of which is pivoted a rod 101, extending the whole length of the machine and is guided by a plate 102 attached to the right hand leg. This rod has an adjustable sleeve 103 with beveled ends which is adapted to be engaged by pins 104, which are carried in the outer or free ends of two arms 105—which arms are pivotally attached to the under side of the traverse nut and they are held together by a spring 106. The pins run close to the rod 101 and as the carriage nears its right hand end position the pins pick up the sleeve and carry the rod to the right until a pin 107 in the rod reaches the guide plate 102, in which position the brushes will be rocked to their upward position above the rifling rod. With the first movement of the traverse nut to the left, before the carriage starts, the friction of the pins 104 will carry the rod 101 to the left and rock the brushes down across the cutter and wipe the chips off before the cutter enters the barrel on its back stroke. With the hook form of cutter only one brush is necessary, but with the scrape form, which are always run in pairs on opposite sides of the rifling head, both brushes are needed.

The spindle is indexed or rotated step by step, between strokes of the rifling rod, so as to cut a plurality of rifling grooves in the barrel. This is accomplished in the following manner: (see especially Figs. 3, 6 and 7). The spindle 10 is provided with an index plate 108, which is placed close to the outside bearing in the head 1 and provided with notches 108ᵃ which hold only in one direction—the machine as shown being designed to cut four rifling grooves. Normally, a pawl 109 which is pivoted on the outside end of the head and controlled by a spring 110, stands in one of the notches and prevents a forward movement and a retaining and locking pawl 111, mounted farther back on the head and controlled by a spring 112, acts against one of four pins 113, which are carried by the index plate. The end of this pawl is slightly beveled so as to produce a cam action on the pins and tends to turn the index forward and holds it firmly against the stop pawl 109, so that the plate is locked from movement in either direction and there is no possibility of lost motion. Outside of the index plate the spindle has a rotating sleeve 115 which is held in place by a collar 114. This sleeve has a flange 115ᵃ at one end and mounted on it are the following parts in the order given: a friction washer 116, a friction disk 117 having two arms 117ᵃ and 117ᵇ, another friction washer 116, a spur gear 118 which is keyed to but slightly slidable on the sleeve, a friction spring 119 and a friction adjusting nut 120 which is threaded on the outer end of the sleeve. The spur gear 118 is in mesh with a pinion 121 which is on the outer end of the feed screw rod—the rod, as already stated, being revolved alternately in opposite directions. The stop pawl 109 has an extending side piece 122 on which is pivoted a latch 123—the latch being held downward by a spring 124. The arm 117ᵇ carries a pawl 125 which has its free end notched for engagement with the pins 113. As the spindle sleeve is positively rotated first in one direction and then the other, the friction disk 117 is carried with it—or carried with it until its movements are intercepted. With the first forward movement of the friction disk, its front arm 117ᵃ strikes the pawl latch 123 and forces the pawl 109 out of its notch in the index plate, thereby releasing the spindle for forward movement, at which time the pawl 125 will have picked up one of the pins 113 and the spindle will be rotated forward. As soon as the arm 117ᵃ passes the latch 123 the stop pawl will be drawn against the index plate by its spring and will be in position to intercept the next notch of the index plate, in which position it will be locked by the retaining pawl, as already stated. A little excessive movement is given the friction disk by the proper proportion between the gear and pinion which drives it. As the spindle sleeve is rotated in reverse direction the parts will return to the position shown in Fig. 6, where they will be stopped by a pin 126 which projects to the right from the arm 117ᵇ, coming in contact with the head 1. The pin 126 is engaged by the hooked end of a safety latch 127 which is carried on the left end of a rock shaft 128, which is square between the bearings in which it is mounted on the rear side of the head and in the tail block. Until this latch is withdrawn the spindle cannot be released and indexed. The square rock shaft has an arm 129 which projects forward (see Figs. 2 and 9) and is adapted to be raised by a cam wedge 130 which is secured on the rear side of the flange 17ᵉ of the carriage. The arm 129 is adjusted to such a position that when the carriage has completed its stroke to the left and the rifling cutter is out beyond the end of the barrel, the wedge 130 will strike the arm 129 and rock the shaft, thereby withdrawing the safety latch. This device makes it impossible to rotate the spindle when the cutter is inside the barrel. For convenience, a permanent safety latch 131, which is pivotally attached to the left end of the head, is provided, which locks the spindle against all movement until released by hand.

Attention is called to the fact that the rotating sleeve on the spindle is connected, directly to the traverse screw by the gears 118 and 121 (Fig. 7). This causes the sleeve to move constantly, first in one direction and then the other, so that the index feed pawl-carrying piece (117) is always urged to move one way or the other—its movements being limited in one direction by the index stop pawl 109 and in the other direction by the pin 126 (Figs. 3 and 6).

When the locking latch 131 is withdrawn, it will be carried over and back with every forward and back movement of the carriage, provided the carriage goes far enough to withdraw the safety latch 127. This makes an exceedingly simple construction, cheap to make and perfectly efficient. The chief wear comes on the friction washers 116 which are serviceable until worn clear out, by reason of the adjustment nut 120, and when worn out are inexpensive to replace.

In some types of rifles they require the rifling grooves to be gradually increased in depth as they approach the muzzle of the barrel. This can be provided for in the following manner (see Figs. 4, 8 and 9). The adjusting screw 55 in the feed screw has a sliding pin 132 which is in contact with the feed rod. The outer end of this pin rests against an incline or wedge end of a cross slide 133 which is carried in a pivoted support 134—the support being pivoted at its front end to a pin 135 in the right hand side of the carriage. The cross slide is urged forward by a C-spring 136 and is adapted to be pushed rearward by a taper bar 137 which is secured on the inside of the front side rail. As the carriage is moved to the right the cross slide 133 comes in contact with the taper bar and the slide is forced backward, thereby driving the feed rod to the left, gradually forcing out the rifling cutter and increasing the depth of the cut as it approaches the muzzle.

In the well known Lee-Enfield rifle the rifling grooves are uniform in depth for one turn of the spiral and then are gradually deepened from there to the muzzle. In this case a special and somewhat simpler form of construction may be used, shown in Fig. 16. The cap 39 on the rotating pulley 43 instead of being screwed on, is fastened by a set screw 138 to prevent its turning and it has an extending sleeve 139 which is provided with a slot 140. The feed rod 37 which, in this case is made larger in diameter at the end, has a pin 141 which fits in the slot 140, so that the feed rod is forced to rotate with the pulley but may be moved lengthwise in its sleeve. The end of the feed rod is provided with a threaded head 142 which works in a nut 143, split on one side so that it may be clamped by an encircling cup 144 which is split on one side and has a clamp screw 145, by means of which the nut is frictionally held to the head 142 and turns or tends to turn with it. The cup 144 has an extending rod 146 which enters the plug of the feed screw from which it gets its regular normal cutting feed movement. The cup is also provided with a side arm 147, which is adapted to strike against the guide block 78—which for this purpose is made a little longer than would otherwise be necessary. With the carriage in its left position, the arm 147 would be on the opposite side of the block from that shown in Fig. 16, and before starting back, the feed rod would be advanced for the normal cutting feed, as already explained. With the first revolution of the rotating pulley 43 which produces the spiral cut, the friction of the nut in the cup will carry the arm around to the position shown in Fig. 16, when the arm 147 will be intercepted by the block 78. Further movement of the rotating pulley unscrews the feed rod head 142 out of the nut and drives the cutter wedge to the left, gradually forcing out the cutter and increasing the depth of the rifling cut gradually and uniformly from that point to the muzzle of the barrel.

With the scrape form of cutter which, as already stated, cuts on the back stroke, there is a tendency to buckle the rifling rod. The rod may be supported and stiffened by a sliding support 148 which is mounted on the side rails to slide between the head 1 and the carriage. This support is connected by a chain 149 to the carriage and the chain is made of such a length that when the carriage is drawn back or out to its right hand position, the support will be left in a central position between the carriage and the head. As the carriage is moved to the left the support will be picked up by the carriage and carried on toward the head, but about half the rifling rod is inside the barrel at this time and does not need support.

The rifling rod is provided with a wiper 150, of felt or other suitable material, which is held by a bracket 151 from one of the side rails. This is to keep the oil with chips from being carried out and dropping down on the traverse screw.

What we claim is:

1. In a rifling machine, a barrel indexing mechanism comprising the following elements: a hollow spindle; means for clamping a barrel therein; an index plate carried by said spindle, having notches therein adapted to hold in one direction only; a stop pawl adapted to engage said notches to prevent forward movement of the spindle; a retaining pawl adapted to engage said plate to lock said plate against said stop pawl; a sleeve mounted to turn on said spindle; a frictionally carried part mounted on said sleeve; means for positively and continuously rotating said sleeve alternately in opposite directions and connections from said frictionally carried part to withdraw said stop pawl and feed said index plate step by step from one notch to another.

2. A spindle-index feed for rifling machines comprising: a sleeve mounted on said spindle; means for constantly rotating said sleeve in alternate, opposite directions; a pawl carrier which is frictionally carried by said sleeve and connections from said pawl-carrier which are adapted to rotate said spindle.

3. In a rifling machine having a screw which is rotated in alternate opposite directions to traverse the carriage and having a barrel-carrying spindle with an index plate, a spindle-index feed comprising: a sleeve mounted on said spindle; direct connections between said traverse screw and said sleeve whereby said sleeve is constantly rotated in alternate opposite directions; a pawl-carrier frictionally carried by said sleeve and connections from said pawl-carrier to said index plate which are adapted to rotate said spindle.

4. In a rifling machine having a traverse screw which is driven alternately in opposite directions, the combination with a spindle, of a sleeve mounted thereon; a gear mounted on said sleeve; a pinion on said traverse screw in mesh with said gear, whereby said sleeve is constantly rotated alternately in opposite directions and frictionally driven connections from said sleeve which are adapted to index said spindle.

5. In a rifling machine having a carriage; a screw adapted to rotate in alternate opposite directions to traverse said carriage; and having a barrel-carrying spindle with an index plate, a spindle-index feed comprising: a sleeve mounted on said spindle; a gear on said traverse screw in mesh with a gear on said sleeve whereby said sleeve is constantly rotated in alternate, opposite directions; a pawl-carrier frictionally carried by said sleeve and which tends constantly to rotate in one direction or the other and having connections to rotate said spindle; in combination with a hooked arm which is normally adapted to engage said pawl-carrier and prevent its movement; a rock shaft on which said hooked arm is mounted; a slidably adjustable arm mounted on said rock shaft and a cam on said carriage which is adapted to strike said slidably adjustable arm to rock said shaft and to withdraw said hooked arm to free said pawl-carrier and permit its being carried by said sleeve.

6. In a rifling machine, the combination with a hollow spindle of a bushing and a cap—said cap being adapted to be screwed on the end of said spindle to retain said bushing—said bushing being formed on its inner side with a chamfered or countersunk hole, for the purpose set forth.

7. In a rifling machine, the combination with a spindle, of an index plate secured to said spindle—said plate being formed with notches and having a corresponding number of side pins; means for periodically moving said plate; a stop pawl adapted to enter said notches and prevent forward movement of the index plate and a spring-seated retaining pawl which is adapted to come against one of said pins—said retaining pawl being formed with an inclined or wedge-shaped end to wedge or force said pin and the index plate forward against said stop pawl.

8. In a rifling machine, the combination of the following elements: a carriage; a traverse screw; a traveling nut slidably mounted on said carriage and engaging said screw; means for rotating said screw alternately in opposite directions to reciprocate said carriage—whereby, on reversing the movement of said screw, said carriage will remain idle until the nut reaches the end of its slidable movement.

9. In a rifling machine, the combination of the following elements: a carriage; a traverse screw—said carriage having two flanges which loosely engage said screw; a traveling nut for said screw slidably mounted on said carriage between said flanges; means for rotating said screw alternately in opposite directions to reciprocate said carriage—the movement of said carriage being delayed on each reversal of the screw movement, until said nut travels from one of said flanges to the other.

10. In a rifling machine, the combination of the following elements: a carriage; a traverse screw; a nut on said screw which is adapted to engage said carriage—said nut having a limited sliding movement on said carriage whereby, on reversing the direction of rotation of said screw, there is an interval of rest for the carriage.

11. In a rifling machine, the combination with a reciprocating carriage of a tubular rifling rod mounted on said carriage, having a rifling head and rifling cutter; a feed rod which is carried inside of said rifling rod and which extends the entire length of said rod; a feed device mounted on said carriage which is adapted to operate said feed rod to push out said cutter and means for rendering said feed device inoperative unless said carriage reaches a predetermined position.

12. In a rifling machine, a reciprocating carriage, in combination with a rifling rod having a head and rifling cutter; a traverse screw; a nut on said traverse screw which is adapted to engage said carriage but which has a limited sliding movement thereon, and connections from said nut which are adapted to feed said cutter during the sliding movement of said nut on said carriage.

13. In a rifling machine, a carriage; a rifling rod mounted on said carriage, having a head and rifling cutter; a traverse screw; means for rotating said screw alternately in opposite directions to reciprocate said carriage; a nut slidably mounted on said carriage and engaging said screw; in combination with a cutter feeding mechanism operated by said nut during its sliding movement on said carriage.

14. In a rifling machine, the combination of the following elements: a reciprocating carriage; a pulley mounted on said carriage; a rifling rod axially connected to said pulley so as to be turned by it and a flexible band or belt secured to said pulley at one end and to some stationary part of the machine at the other end—whereby, on moving said carriage in one direction, said pulley and said rifling rod will be rotated.

15. In a rifling machine, the combination of the following elements: a reciprocating carriage; a pulley mounted on said carriage; a rifling rod axially connected to said pulley so as to be turned by it; an idle sheave mounted on said carriage; a steel tape secured at one end to said pulley, passing around said idle sheave and the other end secured at one end of said machine; a second idle sheave mounted on said carriage and a second steel tape secured to said rotating pulley, reversely wound, passing around said second idle sheave and yieldingly secured at the opposite end of said machine—whereby, on reciprocating said carriage, said rifling rod will be rotated alternately in opposite directions.

16. In a rifling machine, the combination of the following elements: a reciprocating carriage; a pulley mounted on said carriage; a rifling rod axially secured to said pulley; a pair of steel tapes secured to and wound around said pulley in opposite directions— the outer ends of said tapes being secured to the framework of said machine.

17. In a rifling machine, a reciprocating carriage, in combination with a rifling rod rotating device mounted thereon—said device comprising a journaled pulley and a pair of flexible, steel tapes secured to and wound around said pulley in opposite directions and attached to the framework of the machine—one of said tapes having a yielding attachment to said framework.

18. In a rifling machine, a reciprocating carriage, in combination with a rifle rod rotating device mounted thereon comprising a rotating pulley; a flexible steel tape adapted to positively rotate said pulley on movement of said carriage in one direction; a second tape secured to said pulley and reversely wound thereon—said second tape being secured outside to a take-up spring, whereby said first tape controls the rotating movement of said rifling rod in both directions— said second tape acting, under the influence of said spring, to hold said first tape taut at all times.

19. In a rifling machine, the combination of the following elements: a reciprocating carriage; a traverse screw; a nut slidably mounted on said carriage and engaging said screw; means for rotating said screw alternately in opposite directions; a tubular rifling rod mounted on said carriage; a cutter feeding rod carried inside of said rifling rod and projecting beyond the end of the same; a feed device for said feed rod comprising a screw; a ratchet wheel mounted on said screw; a pawl for said ratchet and intermediate connections from said pawl to said nut, whereby the idle or sliding movement of said nut on said carriage will operate said pawl to turn said ratchet wheel to feed the rifling cutter.

20. In a rifling machine, a reciprocating carriage, in combination with a cutter feeding device mounted thereon—said cutter feeding device comprising a feed screw; a ratchet wheel mounted on and adapted to turn said feed screw; a ratchet pawl; means for operating said pawl to turn said ratchet wheel; a lever which is adapted to normally hold said pawl out of engagement with said ratchet wheel and a contact block against which said lever may be moved to rock the same and permit said pawl to become operative in said ratchet wheel.

21. In a rifling machine, the combination with a cutter feeding device comprising a feed screw; a ratchet wheel mounted on said screw and adapted to turn the same; a feed pawl for said ratchet wheel and means for operating said pawl; of a stop or time locking device—said locking device comprising a trigger arm or latch for said feed pawl and an adjustable arm mounted on the hub of said ratchet wheel which is adapted to trip said trigger latch after a predetermined number of revolutions of said ratchet wheel and prevent further engagement of said feed pawl with said ratchet wheel.

22. In a rifling machine having a wedge-operated rifling cutter and a step-by-step feeding device for said wedge, means for withdrawing said wedge a definite amount before said cutter starts on its back or return stroke and positively restoring it to its fed position before the next forward stroke of said cutter—said relieving means being entirely independent of said feeding means.

23. In a rifling machine having a feed rod which is adapted to feed the rifling cutter; a feed screw which is adapted to move said feed rod; in combination with a wedge interposed between said feed rod and said feed screw and means for driving said wedge in at one end of the rifling stroke and withdrawing it at the other end of the stroke, for the purpose set forth.

24. In a rifling machine the combination of the following elements: a reciprocating carriage having a rifling rod and cutter feeding mechanism mounted thereon; a traverse screw; means for alternately rotating said screw in opposite directions; a nut slidably mounted on said carriage and engaging said screw and connections operated by said nut on its sliding movement on said carriage to relieve the rifling cutter at one end and to restore it to cutting position at the opposite end of the stroke.

25. In a rifling machine, a reciprocating carriage having a tubular rifling rod with a projecting feed rod and a feed screw mounted thereon; a transverse wedge interposed between said feed rod and said feed screw; a flanged bar which is adapted to engage said wedge; a spring seated plunger to which said bar is attached; a traveling nut slidably mounted on said carriage; in combination with a traverse screw engaging said nut and means for rotating said screw alternately in opposite directions—said nut being provided with a wedge against which said spring seated plunger rests, whereby the sliding movement of said nut on said carriage will alternately drive in and withdraw said transverse wedge.

26. In a cutter feeding device for rifling machines, a feed screw, in combination with a ratchet wheel mounted on and adapted to turn said screw to feed said cutter; and a variable feed limiting device—said limiting device comprising in its adjustable or variable part an arm threaded on the hub of said ratchet wheel with a similar pitch thread to that of the feed screw and means for clamping said arm in any position on said hub.

27. In a rifling machine the combination of the following elements: a carriage; a traverse screw; a nut slidably mounted on said carriage and engaging said screw; means for rotating said screw alternately in opposite directions to reciprocate said carriage; a chip-brushing mechanism and intermediate connections to said nut, whereby said nut, on its first backward movement before the carriage starts, operates said brushing mechanism to remove the rifling chips.

28. In a rifling machine, a rocking chip brush which is adapted to brush the chips from the rifling cutter, in combination with means for raising said brush before said cutter is out of the barrel and means for giving said brush a downward movement before said cutter starts on its backward stroke.

29. In a rifling machine the combination of the following elements: a carriage; a traverse screw; a nut slidably mounted on said carriage and engaging said screw; means for rotating said screw alternately in opposite directions to reciprocate said carriage; a rocking chip brush; a brush rod extending across the machine near to and parallel with said traverse screw; a sleeve mounted on said rod; connections from said rod to said rocking chip brush which are adapted to rock said brush by longitudinal movement of said brush rod; and a friction clamping device mounted on said nut and adapted to engage said sleeve to move said rod and to operate said brush.

30. In a rifling machine, the combination of the following elements: a reciprocating carriage; a tubular rifling rod mounted on said carriage; a projecting feed rod for the rifling cutter carried in said rifling rod; a normal step-by-step feed mechanism for said feed rod; a taper bar mounted on the frame of the machine and a sliding wedge mounted on said carriage and operated by said taper bar which is adapted to move said feed rod independent of said normal feed to uniformly increase the depth of the rifling cut as it approaches the muzzle of the barrel.

31. In a rifling machine the combination of the following elements: a reciprocating carriage; a tubular rifling rod mounted on said carriage; a feed rod for the rifling cutter carried in said rifling rod and projecting beyond the end thereof; a feed screw which is adapted to move said feed rod to give the normal cutting feed to said cutter; a sliding bolt carried by said screw and adapted to move said feed rod independent of said feed screw; a cross sliding wedge in contact with said bolt and a taper bar mounted on the ways of the machine in the path of said cross slide wedge, substantially as described and for the purpose set forth.

32. In a rifling machine cutter feeding mechanism, a feed screw, in combination with a ratchet wheel mounted on said screw; an arm mounted on the front end of said screw and a stop pin for said arm when said arm is in its starting or zero position—said pin being shorter than the pitch of the thread of said feed screw, substantially as described and for the purpose set forth.

33. In a rifling machine having a reciprocating carriage to which the rifling rod and cutter is attached, means for reciprocating said carriage; a shipper rod adapted to be moved by said carriage to control said reciprocating means; in combination with a shipper lever which is operated by said shipper rod; a pivoted arm, one end of which has a limited, free movement and a spring between said shipper lever and the free end of said arm which is adapted to complete the movement of said shipper lever to insure the full stroke of said shipper rod.

34. In a rifling machine, the combination of the following elements: a carriage; a rifling rod and cutter mounted on said carriage; means for reciprocating said carriage; a clutch for controlling said reciprocating means having a neutral, inoperative position; a shipper rod adapted to control said clutch and itself adapted to be shifted by said carriage; a shipper lever operated by said shipper rod; a spring, one end of which is attached to said shipper lever; a swinging arm, to the free end of which the other end of said spring is attached—the action of said spring insuring complete shifting of said clutch; a latch for said shipper lever which is adapted to stop said lever when said clutch has reached a neutral position and a second latch for locking said shipper lever from backward movement—said latches being reversible in their function according to the direction of the movement of the carriage—whereby said carriage may be accurately stopped at either end of its stroke with the rifling cutter out of the barrel.

In testimony whereof we affix our signatures in presence of two witnesses.

HARRY M. POPE.
F. AMOS JOHNSON.

Witnesses:
MICHAEL J. KING,
J. S. BRAND.